United States Patent
Sakai

(10) Patent No.: US 9,360,613 B2
(45) Date of Patent: Jun. 7, 2016

(54) PLANAR LIGHT SOURCE APPARATUS AND DISPLAY APPARATUS USING SAME

(75) Inventor: Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/577,263

(22) PCT Filed: Apr. 28, 2010

(86) PCT No.: PCT/JP2010/003056
§ 371 (c)(1),
(2), (4) Date: Aug. 6, 2012

(87) PCT Pub. No.: WO2011/135627
PCT Pub. Date: Nov. 3, 2011

(65) Prior Publication Data
US 2012/0307519 A1   Dec. 6, 2012

(51) Int. Cl.
*G02B 6/00* (2006.01)
*F21V 8/00* (2006.01)

(52) U.S. Cl.
CPC ............ *G02B 6/0021* (2013.01); *G02B 6/0016* (2013.01); *G02B 6/0018* (2013.01)

(58) Field of Classification Search
CPC .... G02B 6/0038; G02B 6/0036; G02B 5/045; G02B 6/0021; G02B 6/0016; G02B 6/0018
USPC .......... 362/602, 608, 612, 613, 619, 620, 626
See application file for complete search history.

(56) References Cited

U.S. PATENT DOCUMENTS

| 6,964,500 B2 | 11/2005 | Sakai |
| 7,229,198 B2 | 6/2007 | Sakai et al. |

(Continued)

FOREIGN PATENT DOCUMENTS

| CN | 2435806 Y | 6/2001 |
| CN | 1521541 A | 8/2004 |

(Continued)

OTHER PUBLICATIONS

Hecht, Eugene. "4.7 Total Internal Reflection." Optics. Reading, MA: Addison-Wesley, 2002. 122-27. Print.*

(Continued)

*Primary Examiner* — Sean Gramling
*Assistant Examiner* — Gerald J Sufleta, II
(74) *Attorney, Agent, or Firm* — Oblon, McClelland, Maier & Neustadt, L.L.P.

(57) ABSTRACT

A planar light source apparatus includes a point light source and a light guide plate shaped like a flat plate with a rectangular shape in a plan view. The light guide plate includes an output surface confronting an opening portion, a pair of second side surfaces opposed to each other, and a hole opening in a non-output surface and formed near one of the first side surfaces at a position where the point light source is to be arranged. Each of the pair of second side surfaces is at least partially configured as a prism whose ridge line extends in a direction perpendicular to the output surface and whose cross-section, when sectioned in a direction parallel to the output surface, has a sawtooth-like shape in which concavity and convexity are repeated. A light of the point light source can be efficiently uniformized in the light guide plate, and thus unevenness of brightness can be prevented.

14 Claims, 7 Drawing Sheets

(56) References Cited

U.S. PATENT DOCUMENTS

| | | | |
|---|---|---|---|
| 7,350,951 B2 | 4/2008 | Sakai et al. | |
| 7,384,179 B2 | 6/2008 | Sakai | |
| 7,393,128 B2 | 7/2008 | Sakai et al. | |
| 7,422,357 B1* | 9/2008 | Chang | 362/602 |
| 7,441,938 B2 | 10/2008 | Sakai et al. | |
| 7,604,387 B2* | 10/2009 | Liu | 362/606 |
| 7,604,389 B2 | 10/2009 | Sakai et al. | |
| 7,641,376 B2 | 1/2010 | Sakai et al. | |
| 7,690,831 B2 | 4/2010 | Mori et al. | |
| 7,762,705 B2 | 7/2010 | Sakai et al. | |
| 2004/0183774 A1* | 9/2004 | Manabe | G02B 6/0018 345/102 |
| 2005/0024744 A1* | 2/2005 | Falicoff et al. | 359/737 |
| 2008/0211990 A1 | 9/2008 | Sakai | |
| 2008/0291694 A1 | 11/2008 | Sakai et al. | |
| 2009/0316072 A1* | 12/2009 | Okumura et al. | 349/64 |
| 2010/0073911 A1* | 3/2010 | Ohkawa | 362/97.1 |
| 2010/0079980 A1 | 4/2010 | Sakai | |
| 2010/0165658 A1* | 7/2010 | Huang et al. | 362/606 |
| 2012/0127400 A1 | 5/2012 | Yuuki et al. | |
| 2012/0140519 A1 | 6/2012 | Sakai | |

FOREIGN PATENT DOCUMENTS

| | | |
|---|---|---|
| JP | 2001-92370 | 4/2001 |
| JP | 2002 109942 | 4/2002 |
| JP | 2004 185868 | 7/2004 |
| JP | 2004-186124 | 7/2004 |
| JP | 2006 24439 | 1/2006 |
| JP | 2007 165064 | 6/2007 |
| JP | 3955505 B2 | 8/2007 |
| JP | 2010-45029 | 2/2010 |
| JP | 2010-73574 | 4/2010 |
| WO | 2008 065906 | 6/2008 |

OTHER PUBLICATIONS

Office Action issued on May 21, 2013 in the corresponding Japanese Patent Application No. 2012-512538 (with Partial English Translation).

International Preliminary Report on Patentability issued Dec. 10, 2012 in PCT/JP2010/003056 with English Translation.

Chinese Office Action issued Jun. 5, 2014, in China Patent Application No. 201080066465.7 (with English translation).

U.S. Appl. No. 14/162,254, filed Jan. 23, 2014, Sakai.

International Search Report Issued Aug. 17, 2010 in PCT/JP10/003056 Filed Apr. 28, 2010.

* cited by examiner

F I G. 1
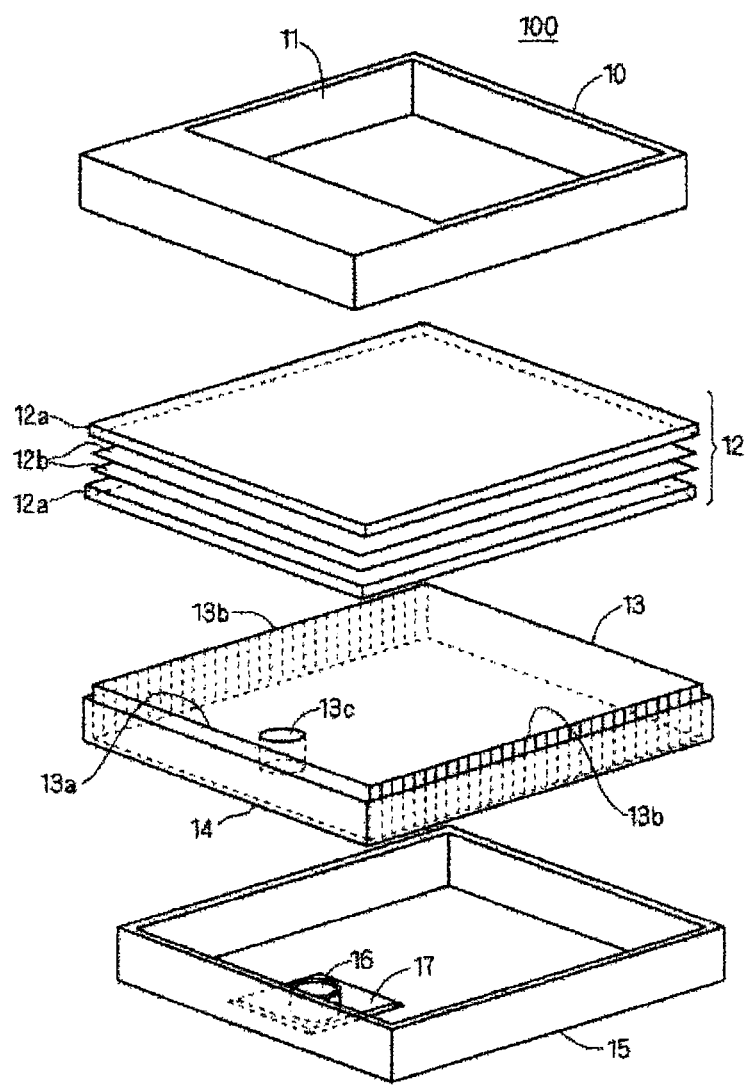

F I G . 3
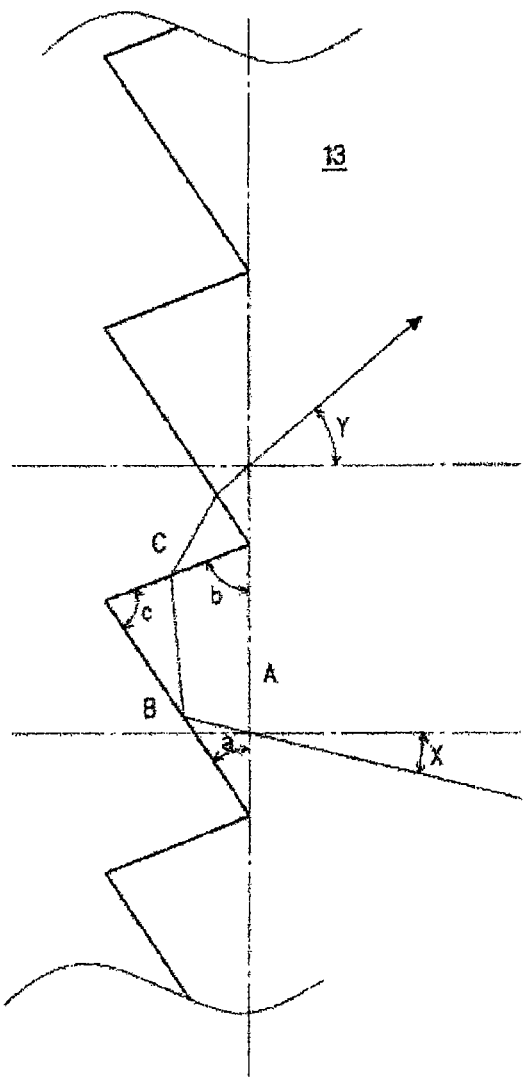
F I G . 4
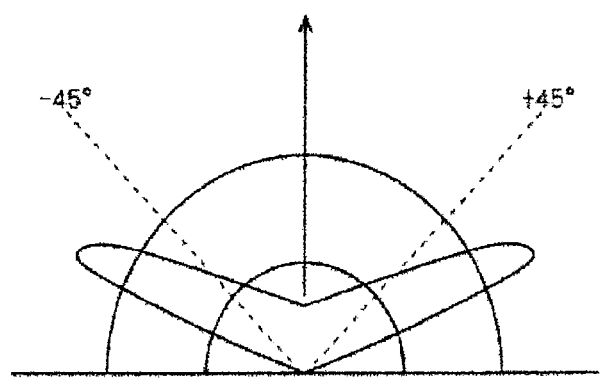

F I G . 5
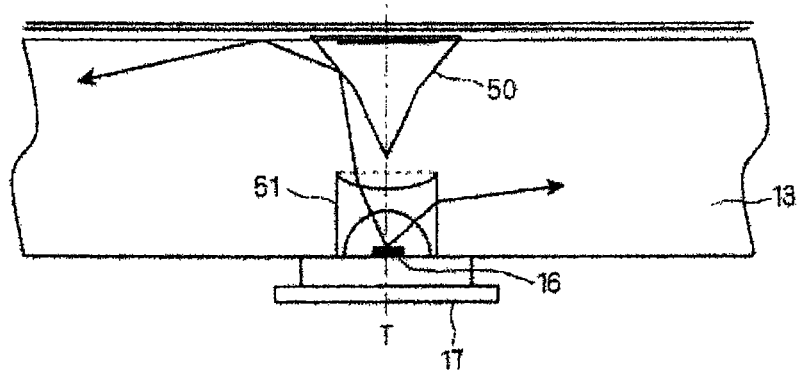
F I G . 6
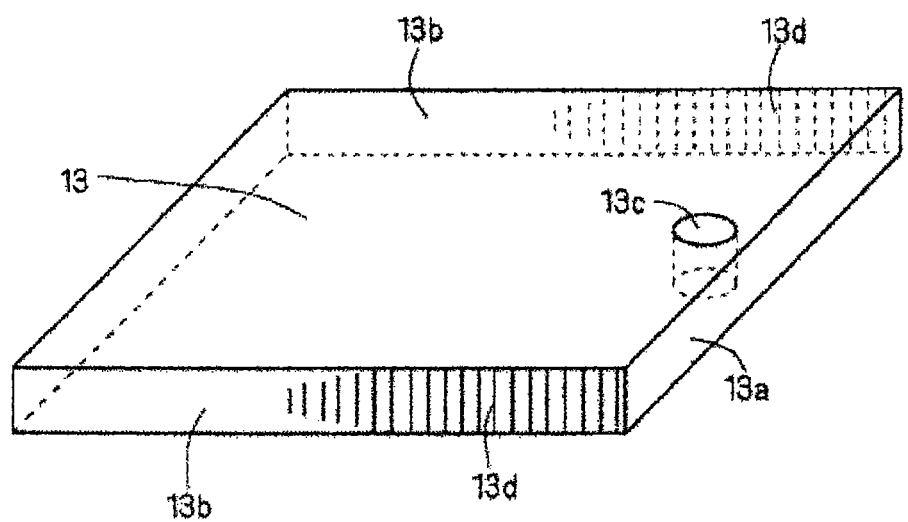

PLANAR LIGHT SOURCE APPARATUS AND DISPLAY APPARATUS USING SAME

TECHNICAL FIELD

The present invention relates to a planar light source apparatus that causes emission by means of a point light source, and a display apparatus using the same.

BACKGROUND ART

In a conventional planar light source apparatus, as shown in Patent Document 1, a hole portion is formed in a light guide plate and an LED is arranged at the center of the hole portion. This configuration enables a light of the LED to be efficiently incident on the light guide plate, so that the brightness of a display part is improved.

PRIOR-ART DOCUMENTS

Patent Documents

Patent Document 1: Japanese Patent Application Laid-Open No. 2002-109942

SUMMARY OF THE INVENTION

Problems to be Solved by the Invention

However, a back light unit and a display apparatus shown in the Patent Document 1 involve a problem that a light of a point light source is reflected at a side surface of the light guide plate so that the light is not uniformly diffused and thus unevenness of brightness occurs, and additionally a problem that a light utilization efficiency is low because the light is outputted from the light guide plate and reflected at a reflecting plate.

An object of the present invention is to solve the above-described problems, and to provide a planar light source apparatus having a high in-plane brightness uniformity and a high light utilization efficiency, and a display apparatus using the same.

Means for Solving the Problems

A planar light source apparatus according to the present invention includes a point light source, a housing having an opening portion, and a light guide plate arranged in the housing and shaped like a flat plate with a rectangular shape in a plan view. The light guide plate includes an output surface confronting the opening portion, a non-output surface opposed to the output surface, a pair of first side surfaces opposed to each other, a pair of second side surfaces opposed to each other, and a hole opening in the non-output surface and formed near one of the first side surfaces at a position where the point light source is to be arranged. Each of the pair of second side surfaces is at least partially configured as a prism whose ridge line extends in a direction perpendicular to the output surface and whose cross-section, when sectioned in a direction parallel to the output surface, has a sawtooth-like shape in which concavity and convexity are repeated.

Effects of the Invention

Such a configuration enables a light incident on the light guide plate and having reached the second side surface to be refracted in a direction away from the point light source. Accordingly, a light of the point light source can be efficiently uniformized in the light guide plate, and thus unevenness of brightness can be prevented.

BRIEF DESCRIPTION OF THE DRAWINGS

FIG. 1 An exploded perspective view of a planar light source apparatus according to an embodiment 1 of the present invention.

FIG. 3 A cross-sectional view of a principal part of the planar light source apparatus according to the embodiment 1 of the present invention.

FIG. 4 A diagram showing a light source light distribution of the planar light source apparatus according to the embodiment 1 of the present invention.

FIG. 5 A cross-sectional view of the planar light source apparatus according to the embodiment 1 of the present invention.

FIG. 6 An exploded perspective view of the planar light source apparatus according to the embodiment 1 of the present invention.

EMBODIMENT FOR CARRYING OUT THE INVENTION

<A. Embodiment 1>

Figure 2:
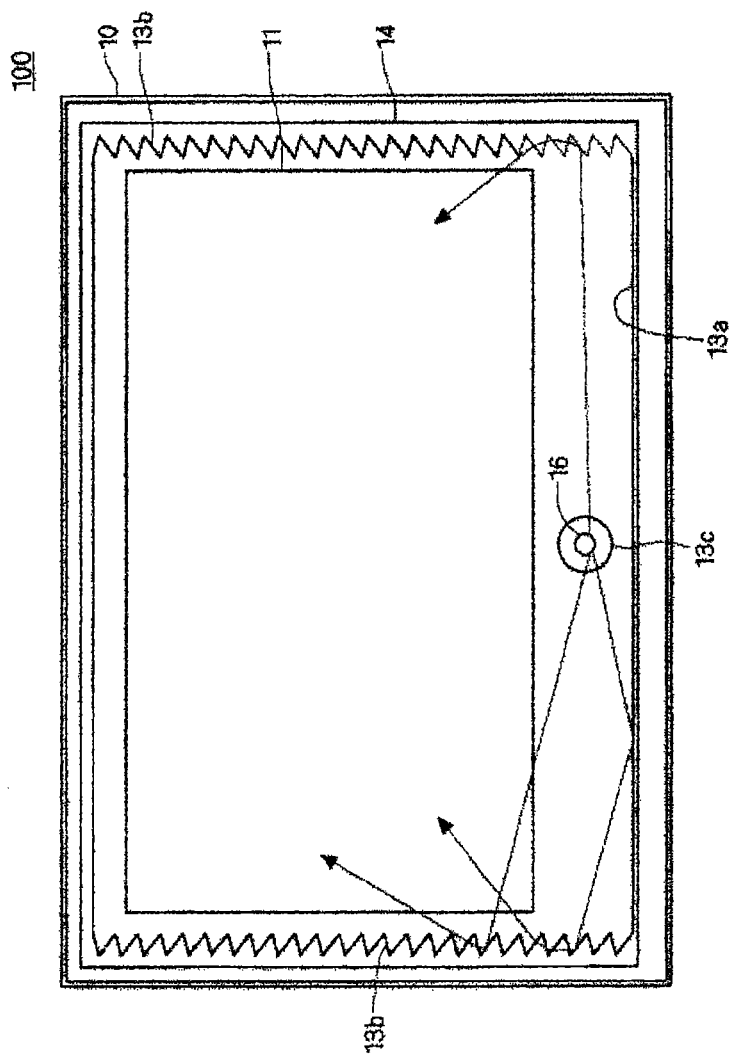
FIG. 2 A front elevational view of the planar light source apparatus according to the embodiment 1 of the present invention.

A configuration of a display apparatus according to the present invention will be described with reference to the drawings. In the drawings, the same reference numeral is used to denote substantially the same configuration.

<A-1-1. Configuration of Planar Light Source Apparatus>

As shown in FIGS. 1 and 2, a planar light source apparatus 100 of the embodiment includes a light guide plate 13 that planarly guides a light and outputs the light from an output surface. The light guide plate 13 is arranged in a housing 10 having an opening portion 11. The light is outputted in a direction where the opening portion 11 is provided, and this direction is defined as an output direction. FIG. 1 shows components in a disassembled state, and FIG. 2 is an overall view as seen from the output surface side that is in the output direction. A point light source 16 is arranged in an accommodation part that is formed in a bottom surface of a housing 15 which is opposed to a surface of the housing 10 where the opening portion 11 is provided.

A diffusion plate (not shown) for diffusing a light and an optical sheet 12 are arranged at the output surface side of the light guide plate 13. In FIG. 1, a reflection sheet 14 (first and second reflection sheets) that reflects a light is provided on a non-output surface located at the side opposite to the output surface of the light guide plate 13 and on a pair of first side surfaces 13a and a pair of second side surfaces 13b of the light guide plate 13. The reflection sheet (second reflection sheet)

provided on the pair of second side surfaces 13b may be omitted, if a prism which will be described later is formed.

That is, in the planar light source apparatus 100 according to this embodiment, the reflection sheet 14 serving as the first and second reflection sheets are arranged on the non-output surface and the side surfaces of the light guide plate 13, in order to efficiently output a light from the output surface. The reflection sheet 14 is made of a material obtained by mixing barium sulfate or titanium oxide with PP or PET, a material obtained by forming fine bubbles in a resin, a material obtained by vapor-depositing silver on a metal plate, or a material obtained by applying a coating containing titanium oxide to a metal plate. It is preferable that the reflection sheet 14 has a reflectance of 90% or higher, in order to suppress a reflection loss occurring in a reflecting surface. Stacking a plurality of reflection sheets 14 can improve the reflectance and thus improve the brightness of the output surface of the planar light source apparatus 100.

Additionally, it is preferable to enhance the reflectance by, for example, coloring the inside of the housing 10 white, because it provides a better internal reflectance and therefore a loss of light is reduced, so that a light utilization efficiency is improved.

The optical sheet 12 arranged on the light guide plate 13 is structured such that a lens sheet 12b is sandwiched between diffusion sheets 12a. In a case where the brightness has to be improved, a plurality of lens sheets 12b are used in optimal combination with a prism direction. In order to improve the diffusion property of the diffusion sheets 12a, two or more diffusion sheets 12a may be used. Depending on light distribution characteristics of the lens sheet 12b, one diffusion sheet 12a may be used or no diffusion sheet 12a may be used. Moreover, a protection sheet or a polarization reflection sheet may be used in combination with the optical sheet 12. The configuration of the optical sheet 12 can be considered as appropriate in view of a desired brightness, light distribution characteristics, and the like.

As for the point light source 16, a point light source 16 such as a light emitting diode (hereinafter referred to as LED) or a laser diode (hereinafter referred to as LD) is used. In this embodiment 1, an LED is mounted to an LED substrate 17. Examples of the LED include a pseudo-white LED having a semiconductor light emitting element for emitting a single color light such as a blue color light, a fluorescent material for absorbing part of the blue light emitted from the semiconductor light emitting element and for emitting a yellow light, and the like. There is also an LED having RED, GREEN, and BLUE semiconductor light emitting elements, for emitting a white light by combining the three single color lights. In this embodiment, the pseudo-white LED is used.

On the LED substrate 17 used in this embodiment 1, a light source is held, and additionally a circuit pattern for supplying power to the light source is formed. Since the light source is mounted to the LED substrate 17 that is a metal core (hereinafter referred to as MC) substrate, heat generated by the light source can be efficiently transferred to neighborhoods thereof. Since the light source is mounted to an FPC (Flexible Printing Circuit) having a small thickness, the heat of the light source can be further efficiently transferred to the neighborhoods thereof, and moreover the outer size of the planar light source apparatus 100 can be reduced.

A display element (not shown) is arranged on the planar light source apparatus 100 configured in the above-described manner. As this display element, for example, a liquid crystal display panel that makes use of the birefringence of a liquid crystal, or a display panel that has characters or pictures printed on a transparent plate, is used. In this embodiment, the liquid crystal display panel is used as the display element.

The liquid crystal display panel includes a color filter substrate, a TFT substrate, a spacer, a sealing material, a liquid crystal, a sealant, an alignment film, and a polarization plate (not shown). The color filter substrate has a color filter, a light shield layer, a counter electrode, and the like, formed on the substrate. The TFT substrate has a thin film transistor (hereinafter referred to as TFT) serving as a switching element, a pixel electrode, and the like, formed on the substrate. The spacer maintains an interval between the color filter substrate and the TFT substrate that are arranged opposed to each other. The sealing material bonds the color filter substrate and the TFT substrate to each other. The liquid crystal is sandwiched between the color filter substrate and the TFT substrate. The sealant seals an injection port through which the liquid crystal is injected. The alignment film aligns the liquid crystal. The liquid crystal display panel changes a light distribution of the liquid crystal layer depending on ON or OFF of a voltage made by the switching element (not shown), modulates a light incident on the liquid crystal display panel in accordance with a video signal, and displays the light in red color (R), green color (G), or blue color (B).

<A-1-2. Configuration of Light Guide Plate>

In the following, particularly, a configuration of the light guide plate 13 in the planar light source apparatus 100 will be described.

The light guide plate 13 is shaped like a flat plate with a rectangular shape in a plan view, and includes the output surface, the non-output surface opposed to the output surface, the first side surface 13a that is perpendicular to the output surface and the non-output surface and that is adjacent to the point light source 16, the pair of second side surfaces 13b that is perpendicular to the first side surface 13a and that are opposed to each other, and the other first side surface 13a that is opposed to and paired with the first side surface 13a.

As described above, the light guide plate 13 has a plate-like shape, and is made of a transparent acrylic resin, a polycarbonate resin, glass, or the like. A light scattering portion for disarranging a light propagation direction and guiding the light to the output surface is formed in the non-output surface of the light guide plate 13 (not shown). The light scattering portion functions as means for reflecting the light to the inside of the light guide plate 13. For the reflection, for example, there is a method in which a dot print is printed on the non-output surface, a method in which the non-output surface is roughened to form an embossed surface, or a method in which fine spherical surfaces or concavity and convexity are formed.

The light guide plate 13 has a hole 13c formed at a position where the point light source 16 is to be arranged. In this embodiment 1, the hole 13c includes therein the point light source 16, and extends through the light guide plate 13 from the non-output surface that is the bottom surface to the output surface. Although the cross-sectional shape of the hole 13c is selectable from any shapes such as a circular shape, a square shape, and a hexagonal shape, it is desirable that an inner circumferential surface of the hole 13c is a mirror surface not having concavity and convexity.

Since a reflecting portion (not shown) is provided in the light guide plate 13 at the output surface side at least in the position of the hole 13c, the light emitted immediately upward from the point light source 16 is reflected, and therefore the light utilization efficiency is improved. That is, forming the embossed surface by roughening the output surface of the light guide plate 13 exerts the same effects as when reflection means is provided in the non-output surface of the light guide plate 13. More specifically, the light having reached the output surface of the light guide plate 13 has its light propagation direction scattered by the concavity and convexity formed by the roughened output surface. As a result, a part of the light incident on the output surface is reflected to the inside of the light guide plate 13, while the rest of the light is outputted through the output surface to the outside of the light guide plate 13. Accordingly, even if the embossed surface is formed only in the output surface of the light guide plate 13 without providing the reflection means in the non-output surface, a reflection function similar to that of the dot pattern provided in the non-output surface can be implemented.

In a case where the hole 13c is not formed through the light guide plate 13 from the non-output surface to the output surface but the hole 13c is formed so as to extend from the non-output surface merely to the inside of the light guide plate 13, it is preferable to provide a reflecting plate (not shown) at the output surface side at the hole 13c in a position immediately above the point light source 16. This is because the light of the point light source 16 that directly reaches the opening portion 11 of the housing 10 can be shielded by a reflecting plate having a smaller area as compared with when a reflecting portion is provided in the output surface of the light guide plate 13.

In this embodiment 1, as an example of the light guide plate 13 having a rectangular shape in a plan view, the one having an elongated rectangular shape is shown. However, the present invention is not limited thereto, and the light guide plate 13 may have a wedge-like shape in which the plate thickness gradually decreases with increase of the distance from the point light source 16 (not shown). The light guide plate 13 having a wedge-like shape enables a propagating light to be efficiently guided to the output surface. This consequently reduces the amount of light that is reflected by the reflection sheet 14 provided on the side surfaces of the light guide plate 13, and therefore a reflection loss occurring in the reflection sheet 14 provided on the side surfaces can be reduced. Thus, the amount of output from the output surface can be increased.

Furthermore, in the planar light source apparatus 100 according to this embodiment 1, the output surface or the non-output surface of the light guide plate 13 may be mirror-finished, roughened, printed with a dot pattern, color-printed, or the like. If the output surface or the non-output surface of the light guide plate 13 is roughened so that an embossed surface is formed, the display quality level of the output surface of the light guide plate 13 can be further improved.

In this embodiment 1, the light of the point light source 16 is incident on an inner surface of the hole 13c of the light guide plate 13. Alternatively, as shown in FIG. 5, it is possible that the above-described hole 13c is provided at the non-output surface side of the light guide plate 13 and formed as a second recess 51 that extends merely to a middle of the light guide plate 13, for accommodating the point light source 16 therein. A protrusion protruding toward the non-output surface side is formed in the second recess 51. In FIG. 5, the upper side of the drawing is in the light output direction. At the output surface side of the light guide plate 13, a first recess 50 is formed at a position opposed to the second recess 51. The first recess 50 has such a shape that two cones having different apex angles are combined. Even in a case of using a light source (perfect diffusion light) having no special light distribution as shown in FIG. 5, a light from the light source can be efficiently made incident on the light guide plate 13, and thus a planar brightness can be further increased.

<A-1-3. Configuration of Prism>

FIG. 3 is an enlarged view of a principal part of the second side surface 13b that is formed in the light guide plate 13. In FIG. 3, the light guide plate 13 is shown in a right-hand part of the drawing, and a region corresponding to an air space is shown in a left-hand part of the drawing. The second side surface 13b of the light guide plate 13 serves as the boundary therebetween, and sawtooth-like concavity and convexity are formed therein. Here, the light output direction is the same as that of FIG. 2. The concavity and convexity formed in the second side surface 13b are configured as prisms whose ridge lines extend in parallel with the direction connecting the output surface to the non-output surface of the light guide plate 13. These prisms are formed of a plurality of triangles having the same cross-sectional shape.

A configuration of the prism will be described. In the triangle that forms the prism, when seen in the cross-sectional shape in the direction parallel to the output surface, an apex angle relative to the second side surface 13b is defined as an angle c (an apex angle portion of the sawtooth-like ridge line), an angle formed from a valley of the sawtooth shape to a peak of the sawtooth shape at the first side surface 13a side located farther from the point light source 16 is defined as a bottom angle a, and an angle formed from a valley of the sawtooth shape to the peak of the sawtooth shape at the first side surface 13a side located closer to the point light source 16 is defined as a bottom angle b. In the cross-sectional shape in the direction parallel to the output surface of this embodiment 1, a bottom side connecting valleys of the sawtooth shape is defined as a side A, a side forming the bottom angle a is defined as a side B, and a side forming the bottom angle b is defined as a side C. Each of the above-mentioned angles is formed so as to satisfy the relationship of bottom angle a<bottom angle b, and preferably so as to set the bottom angle a to be about 45 degrees. The bottom angle b is preferably the right angle, and more preferably about 80 degrees in terms of the moldability and the detachability of the light guide plate 13 during manufacture thereof. The pitch of the concavity and convexity in the side A is preferably 0.1 mm or more and 0.5 mm or less, in terms of the moldability and the detachability of the light guide plate 13 and in order to prevent an increase of the size of the light guide plate 13.

In the description of this embodiment 1, the prisms constituted of the concavity and convexity are formed throughout the entire surface of the second side surface 13b of the light guide plate 13. Instead, the prism shape may be formed locally in the second side surface 13b.

FIG. 6 is an exploded perspective view of the light guide plate 13, showing a case where the prisms are formed locally in the second side surface (prisms 13d of FIG. 6). Particularly, with respect to a portion of the second side surface 13b near a surface that is perpendicular to the point light source 16, the light of the point light source 16 is outputted through the second side surface 13b, then reflected at the reflection sheet 14 provided on the second side surface 13b, and then made incident on the light guide plate 13 again through the second side surface 13b. Accordingly, a corresponding portion of the output surface has an increased brightness. Therefore, forming prisms 13d in this portion are preferable because a distribution of a surface brightness of the output surface can be uniformized.

If the prisms 13d are formed in a portion of the second side surface 13b whose angle relative to the point light source 16 is in a range of 90 to 45 degrees, the light of the point light source 16 which is outputted through the second side surface 13b can be reduced. Moreover, in a portion having an angle of 45 degrees or less, the light of the point light source 16 is totally reflected at the second side surface 13b, and therefore the brightness is further improved.

<A-2. Operation>

Next, an operation of the planar light source apparatus 100 will be described below.

In the planar light source apparatus 100, the light emitted from the point light source 16 is diffused through the light guide plate 13 and thereby a uniform light distribution is made in the output surface of the light guide plate 13, and the light is radiated from the opening portion 11 provided in the housing 10, so that an image or the like is displayed by using a display element (not shown) arranged thereon. Among them, particularly, a light path in the light guide plate 13 in a case where the prisms are formed in the second side surface 13b will be described below.

Next, a light path of the light emitted from the point light source 16 will be described with reference to FIG. 3. The light emitted from the point light source 16 is, through an inner side surface of the hole 13c of the light guide plate 13, incident on the light guide plate 13, and propagates through the light guide plate 13. In the light propagating through the light guide plate 13, a light having reached the second side surface 13b is totally reflected at the side B of the prisms and then outputted from the side C through the light guide plate 13 to the air space. Here, the light is refracted toward the center of the light guide plate 13. The light outputted from the side C is, through the side B of the neighboring triangle, incident on the light guide plate 13 again. In the incidence, the light is refracted toward the center of the light guide plate 13. The light incident on the light guide plate 13 propagates through the light guide plate 13 while repeating the total reflection at the boundary between the light guide plate 13 and the air space surrounding the light guide plate 13. When the light propagating through the light guide plate 13 reaches a dot print (not shown) applied to the non-output surface of the light guide plate 13, the light is diffusely reflect so that the light propagation direction is changed. Due to this change in propagation, the light no longer satisfies a critical angle at the boundary between the light guide plate 13 and the air space surrounding the light guide plate 13, and thus is outputted through the output surface of the light guide plate 13.

When the light of the point light source 16 shown in FIG. 3 is reflected at the side B, an angle X formed from the point light source 16 to a reflection point and an angle Y of the reflected light having passed through the side C and being incident on the light guide plate 13 again have such a relationship that the angle Y is larger than the angle X. This causes the light to propagate in a direction away from the point light source 16 (toward the other first side surface 13a). Therefore, a propagation efficiency is improved, and unevenness of the brightness can be reduced.

FIG. 4 shows a light distribution of the point light source 16 according to this embodiment 1. An upward direction (arrowed direction) in the drawing corresponds to the light output direction, and a distribution in a case where the point light source 16 is arranged at the center of the semicircle is shown.

Referring to FIG. 4, the point light source 16 of this embodiment 1 has a light distribution in which the luminous intensity has the maximum value when the angle of light emitted from the point light source 16 is ±80°, where a clockwise direction from the vertical direction relative to the central axis is defined as a positive direction. In a case where such a point light source 16 is used, the light incident on the inner surface of the hole 13c of the light guide plate 13 has the maximum luminous intensity when the incident angle thereof is 10°.

Thus, most of the light emitted from the point light source 16 is substantially perpendicularly incident on the inner surface of the hole 13c of the light guide plate 13 and is not reflected at the inner surface. Therefore, the amount of light reflected at the reflecting plate provided at the output surface side of the hole 13c can be reduced, so that the incidence is efficiently caused.

<A-3. Effects>

In the embodiment 1 of the present invention, the planar light source apparatus 100 includes the housing 10 having the opening portion 11, and the light guide plate 13 that is arranged in the housing 10 and shaped like a flat plate with a rectangular shape in a plan view. The light guide plate 13 has the output surface confronting the opening portion 11, the non-output surface opposed to the output surface, the pair of first side surfaces 13a opposed to each other, the pair of second side surfaces 13b opposed to each other, and the hole 13c formed on the non-output surface and opening near one of the first side surfaces 13a. The planar light source apparatus 100 further includes the point light source 16 that is arranged in the hole 13c, and the reflection sheet 14 serving as the first reflection sheet that is arranged in the housing 10 so as to face at least the pair of first side surfaces 13a and the non-output surface of the light guide plate 13. Each of the pair of second side surfaces 13b is at least partially configured as prisms whose ridge lines are perpendicular to the output surface and whose cross-sections, when sectioned in a direction parallel to the output surface, have a sawtooth-like shape in which concavity and convexity are repeated. As described above, by providing the prisms particularly in the second side surface 13b of the light guide plate 13, the light of the point light source 16 having reached the prisms provided in the second side surface 13b can be refracted toward the center of the light guide plate 13. This can considerably reduce the light outputted through the second side surface 13b of the light guide plate 13 and reflected at the reflection sheet 14 adjacent to the second side surface 13b. Accordingly, the reflection loss of light is reduced, and the light utilization efficiency is improved.

In the embodiment 1 of the present invention, as shown in FIG. 3, the angle Y of the incident light refracted and reflected by the prisms of the second side surface 13b is larger than the angle X of the light incident on the second side surface 13b. As a result, the light propagates in a direction away from the point light source 16. Accordingly, the light that is outputted after hitting the dot print formed on the non-output surface of the light guide plate 13 can be suppressed at the second side surface 13b. Therefore, unevenness of the brightness in the vicinity of the second side surface 13b can be reduced, and moreover, since the light is refracted in the direction away from the point light source 16, the light propagation direction closer to the ideal is obtained. Thus, the light utilization efficiency is further improved.

In the embodiment 1 of the present invention, the light incident on the second side surface 13b of the light guide plate 13 includes not only the light emitted directly from the point light source 16. The light from the point light source 16 that is incident through the inner surface of the hole 13c of the light guide plate 13 and then directed toward the first side surface 13a (the light in the case of FIG. 3) is totally reflected at the boundary of the first side surface 13a, and then incident on the second side surface 13b. This can further improve the light utilization efficiency. The same effects are expected to be exerted also in the side surface (the other second side surface 13b) opposed to the second side surface 13b described in FIG. 3.

In this embodiment 1, in the planar light source apparatus 100, the hole 13c is formed through the light guide plate 13 to extend between the bottom surface that is the non-output surface and the output surface. Accordingly, a space for arranging the point light source 16 can be formed, so that the light of the point light source 16 can be efficiently incident on the light guide plate 13. Thus, the light propagation efficiency is improved.

In this embodiment 1, in the planar light source apparatus 100, the first recess 50 having a conical shape is provided in the light guide plate 13 at the position opposed to the hole 13c, and the hole 13c is formed as the second recess 51 that extends to a middle of the light guide plate 13. Accordingly, the light of the point light source 16 that directly reaches the opening portion 11 of the housing 10 can be shielded by a reflecting plate having a smaller area as compared with when a reflecting portion is provided in the output surface of the light guide plate 13.

In this embodiment 1, in the planar light source apparatus 100, the prism of the second side surface 13b has a bottom angle a as a first angle and the bottom angle b as a second angle, and the bottom angle a is smaller than the bottom angle b. This causes the light reflected by the prism to propagate in the direction away from the point light source 16. Therefore, an ideal light propagation direction is achieved, and thus unevenness of the brightness can be reduced.

In this embodiment 1, in the planar light source apparatus 100, the bottom angle b that is the second angle is approximately 80 degrees. This causes the light reflected at the second side surface 13b of the light guide plate 13 to propagate in a desirable direction.

In this embodiment 1, in the planar light source apparatus 100, the bottom angle a that is the first angle is 50° or less. This causes the light reflected at the second side surface 13b of the light guide plate 13 to propagate in a desirable direction. Therefore, an ideal light propagation direction is achieved, and thus unevenness of the brightness can be reduced.

In this embodiment 1, in the planar light source apparatus 100, the prisms are provided in a part of the second side surface 13b, for example, in a portion of the second side surface 13b whose angle relative to the point light source 16 is in a range of 90 to 45 degrees. This can reduce an output of the light of the point light source 16 through the second side surface 13b. Additionally, in a portion having an angle of 45 degrees or less, the light of the point light source 16 is totally reflected at the second side surface 13b, and therefore the brightness is further improved.

In this embodiment 1, in the planar light source apparatus 100, the reflection sheet 14 serving as the second reflection sheet that is arranged so as to face the second side surface is further provided. This can reflect the light outputted through the second side surface, and thus the light utilization efficiency is improved.

In the this embodiment 1, in the planar light source apparatus 100, a light emitting diode configured to emit any of a red color light, a green color light, a blue color light, and a white color light is provided as the point light source 16. This enables a display in accordance with the emitted light.

In this embodiment 1, in the display apparatus, a display panel is further provided on the opening portion 11. Accordingly, an image or the like having reduced unevenness of brightness can be displayed.

B. Embodiment 2

<B-1. Configuration of Prism>

In the following, a configuration of a planar light source apparatus 100 according to this embodiment 2 will be described. Except the shape of the second side surface 13b of the light guide plate 13, the configuration of the embodiment 2 is the same as that of the embodiment 1. Thus, a description thereof is omitted.

Figure 7:
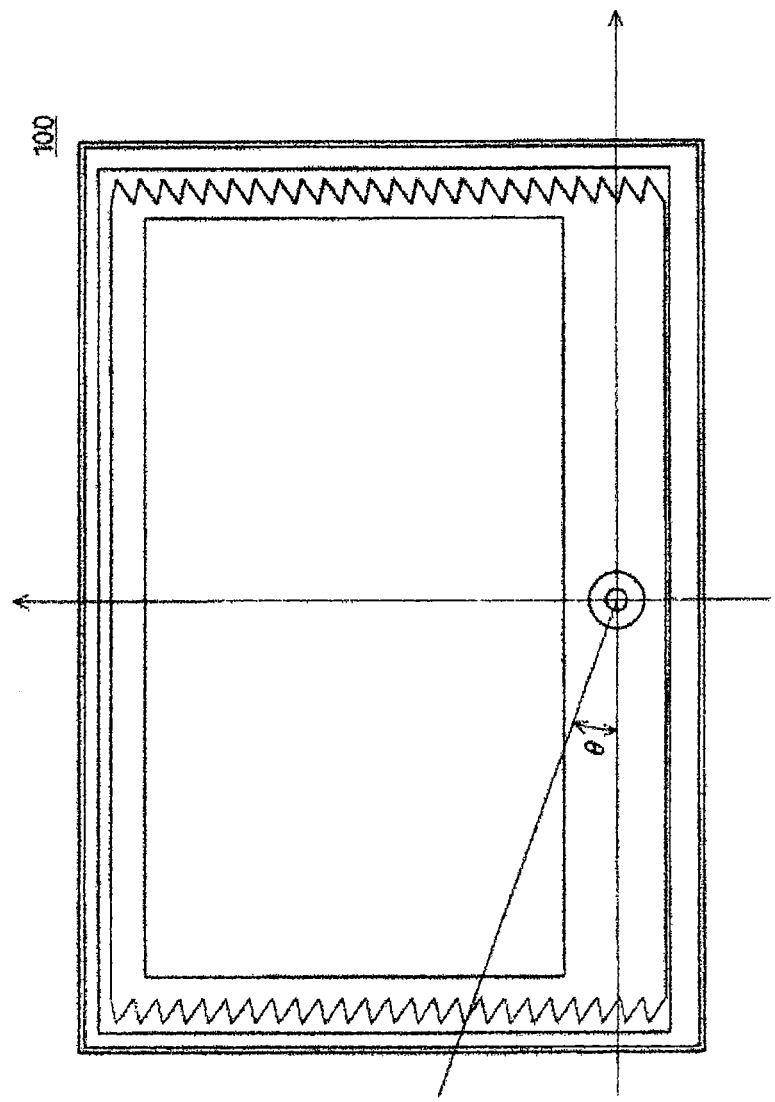
FIG. 7 A front elevational view of a planar light source apparatus according to an embodiment 2 of the present invention.
Figure 8:
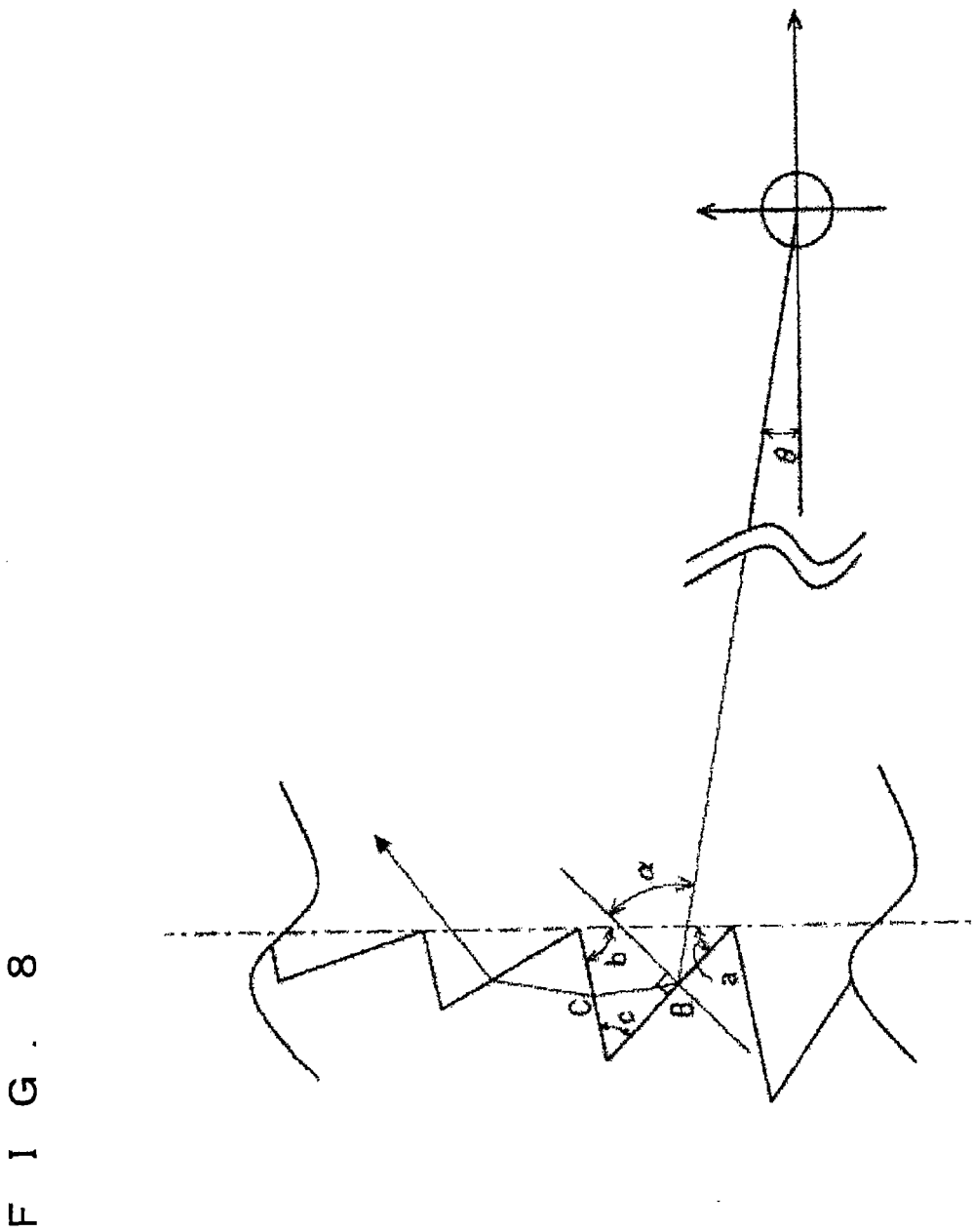
FIG. 8 A cross-sectional view of a principal part of the planar light source apparatus according to the embodiment 2 of the present invention.

FIG. 7 is a front elevational view of the planar light source apparatus 100 according to the embodiment 2. FIG. 8 shows details of prisms of the second side surface 13b of the light guide plate 13 of the planar light source apparatus 100. The planar light source apparatus 100 according to this embodiment 2 which will be described below exerts, except functions and effects unique thereto, the same functions and effects as those of the planar light source apparatus 100 according to the embodiment 1.

Although in the embodiment 1, all the prisms have the same shape, the prisms of the embodiment 2 are as shown in FIG. 8.

As shown in the drawing, an angle by which the light emitted from the point light source 16 to the second side surface 13b travels to a reflection point on the side B in the cross-section of FIG. 7 is defined as an angle θ. The angle θ is an angle formed between a line perpendicular to the second side surface 13b and a line connecting the point light source 16 to the reflection point. The same definition applies also to the opposed second side surface 13b (not shown). In the planar light source apparatus 100 according to the embodiment 2, the bottom angle a of the prism defined in the embodiment 1 satisfies a relationship of bottom angle a≈angle α–angle θ, when the refractive index of the light guide plate 13 is defined as n. Here, the angle α is defined as angle a>arcsin(1/n), and it can be expressed that bottom angle a+angle θ>arcsin(1/n).

In this embodiment 2, in a case where an acrylic having a refractive index n=1.49 is used as a material of the light guide plate 13, it is necessary that the angle α is larger than 42.16°. To obtain sufficient reflection characteristics, the angle α is set to be 45±2°. A prism region ranges to a portion where the bottom angle a is 0°. In a portion where the bottom angle a is 0° or less, the second side surface 13b is formed as a mirror surface. The bottom angle b is preferably 80° similarly to the embodiment 1, but is changeable in view of the moldability and the detachability of the light guide plate 13 during manufacture thereof.

<B-2. Operation>

Next, an operation of the planar light source apparatus 100 will be described below.

In the planar light source apparatus 100, similarly to the embodiment 1, a uniform light distribution is formed by using the light guide plate 13, and an image or the like is displayed by using a display element. Among them, particularly, a light path passing through the prisms formed in the second side surface 13b will be described.

Similarly to FIG. 3, FIG. 8 shows the light guide plate 13 in a right-hand part and the air space in a left-hand part, and also shows the shape of the second side surface 13b serving as a boundary therebetween, for a description of a path of the light emitted from the point light source 16. A light emitted from a light emitting part of the point light source 16 is incident on the light guide plate 13 through the inner surface of the hole 13c of the light guide plate 13. In the incident light, a light that has reached the second side surface 13b directly or after totally reflected at the first side surface 13a is incident on the side B of the triangle formed in the second side surface 13b with an incident angle α.

In this embodiment 2, a case where an acrylic having a refractive index of 1.49 is used as the material of the light guide plate 13 is considered. On the side B, total reflection occurs. The totally reflected light is outputted through the side C to the air space, and incident on the side B of the triangle at the point light source 16 side. The incident light propagates through the light guide plate 13 again. Accordingly, the incident angle of light incidence on the side B is uniform irrespective of a position on the second side surface 13b. Therefore, the light can be efficiently reflected, and thus the efficiency of light incidence is improved.

<B-3. Effect>

In this embodiment 2, in the planar light source apparatus 100, the angle by which the light travels from the point light source 16 to the reflection point on the side B in the cross-section of FIG. 7 is defined as the angle θ as shown in the drawing, and the prisms are shaped such that the bottom angle a that is the first angle decreases with increase of the distance from the point light source 16 to the reflection point. As a result, the incident angle of light incidence on the side B is uniform irrespective of a position of the reflection point on the second side surface 13b. Therefore, the light can be efficiently reflected, and thus the efficiency of light incidence is improved.

In this embodiment 2, in the planar light source apparatus 100, the refractive index of the light guide plate 13 is defined as n, and the prisms are shaped such that the angle θ described above and the bottom angle a that is the first angle satisfy a relationship of bottom angle a+angle θ>arcsin(1/n). Accordingly, the incident angle of light incidence on the side B is uniform irrespective of a position of the reflection point on the second side surface 13b. Therefore, the light can be efficiently reflected, and thus the efficiency of light incidence is improved.

Figure 9:
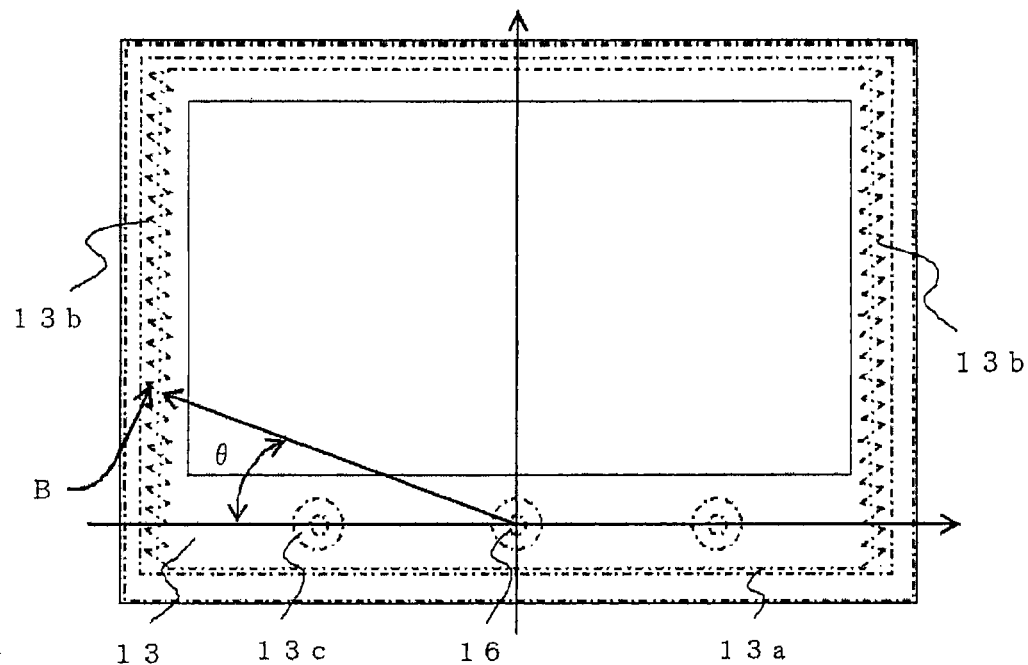
FIG. 9 A front elevational view of the planar light source apparatus according to the embodiment 2 of the present invention.
Figure 10:
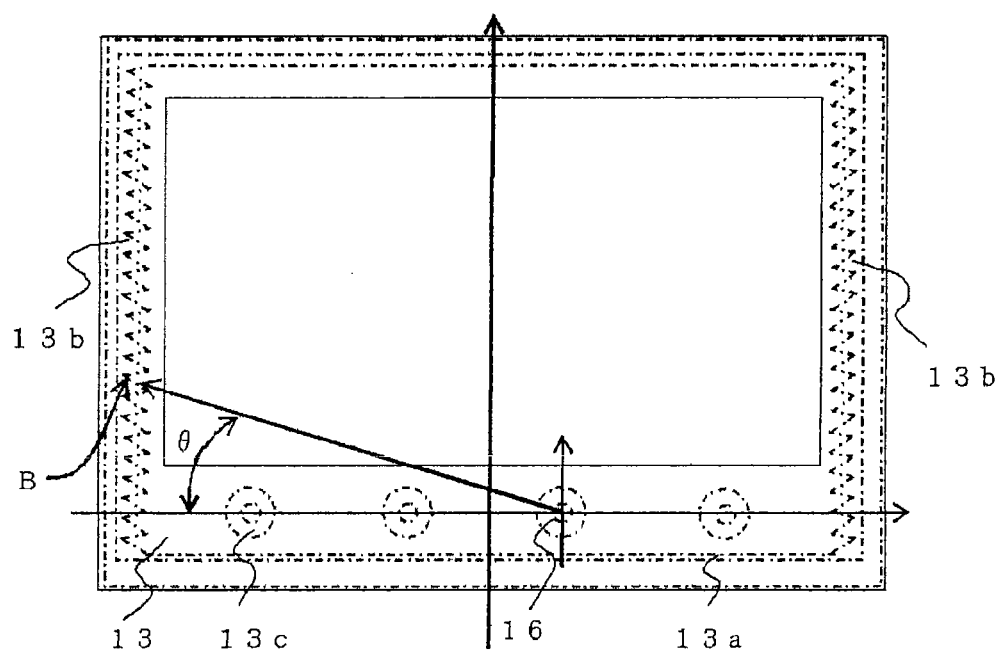
FIG. 10 A front elevational view of the planar light source apparatus according to the embodiment 2 of the present invention.

In the description of the present invention given above with reference to the drawings, a case where the number of the point light sources 16 arranged in the light guide plate 13 is one has been illustrated. Needless to say, however, a plurality of point light sources 16 may be arranged. In a case of arranging a plurality of point light sources 16, as shown in FIGS. 9 and 10, they are arranged substantially in a straight line that is substantially in parallel with the first side surface 13a. In a case where the number of point light sources 16 arranged is odd, as shown in FIG. 9, the angle that is defined as θ is an angle by which the light emitted from the center of, among the point light sources 16 arranged substantially in a straight line, the point light source 16 arranged in or near the middle travels to the reflection point on the side B of the concavity and convexity formed in the second side surface 13b of the light guide plate 13. In a case where the number of point light sources 16 arranged is even, as shown in FIG. 10, the angle that is defined as θ is an angle by which the light emitted from the center of, among the point light sources 16 arranged in or near the middle between the second side surfaces 13b, the point light source 16 positioned farther from one second side surfaces 13b travels to the reflection point on the side B of the concavity and convexity formed in the one second side surface 13b.

In this embodiment 2, in the display apparatus, the display panel is further provided on the opening portion 11. Accordingly, an image or the like having reduced unevenness of brightness can be displayed.

DESCRIPTION OF THE REFERENCE NUMERALS 10, 15 housing; 11 opening portion; 12 optical sheet; 12a diffusion sheet; 12b lens sheet; 13 light guide plate; 13a first side surface; 13b second side surface; 13c hole; 13d prism; 14 reflection sheet; 16 point light source; 17 LED substrate; 50 first recess; 51 second recess; 100 planar light source apparatus.

The invention claimed is:

1. A planar light source apparatus comprising:
   a point light source;
   a housing having an opening portion; and
   a light guide plate arranged in said housing and having a flat plate shape, which flat plate shape is rectangular in a plan view,
   wherein
   said light guide plate includes an output surface confronting said opening portion, a non-output surface opposed to said output surface, a pair of first side surfaces opposed to each other, a pair of second side surfaces opposed to each other, and a hole opening in said non-output surface, wherein said hole is located closer to one of said first side surfaces where said point light source is to be arranged than to either of said second side surfaces,
   each of said pair of second side surfaces is at least partially configured as a prism in form, whose ridge line extends in a direction perpendicular to said output surface and whose cross-section, when sectioned in a direction parallel to said output surface, has a sawtooth shape in which concavity and convexity are repeated,
   wherein in said prism, an angle from a valley of said sawtooth shape to a peak of said sawtooth that is adjacent to said valley and located at a side farther from said point light source is defined as a first angle, and an angle from a valley of said sawtooth to a peak of said sawtooth that is adjacent to said valley and located at a side closer to said point light source is defined as a second angle,
   wherein said first angle and said second angle of said prism are arranged such that incident light from said point light source and guided by said light guide plate is reflected and refracted from said prism back into said light guide plate, and
   wherein said first angle and said second angle of said prism are arranged such that the reflected and refracted light propagates in a direction away from the one of said first side surfaces and said point light source, and such that incident light from said point light source is reflected and refracted from said prism such that an angle of the reflected and refracted light, relative to a direction parallel to said first side surfaces, is greater than an angle of the incident light.

2. The planar light source apparatus according to claim 1, wherein
   said hole is a pass-through hole extending from said non-output surface to said output surface.

3. The planar light source apparatus according to claim 1, wherein
   said light guide plate further includes a first recess having a conical shape that is formed in said output surface of said light guide plate at a position opposed to said hole,
   said hole is a second recess formed in said non-output surface to extend to a middle of said light guide plate.

4. The planar light source apparatus according to claim 1, wherein said first angle is smaller than said second angle.

5. The planar light source apparatus according to claim 4, wherein said second angle is 80°.

6. The planar light source apparatus according to claim 4, wherein said first angle is 50° or less.

7. The planar light source apparatus according to claim 1, wherein
   said light guide plate has said prism provided in a part of said second side surface.

8. The planar light source apparatus according to claim 1, further comprising
   a first reflection sheet arranged in said housing to face at least said pair of first side surfaces and said non-output surface of said light guide plate.

9. The planar light source apparatus according to claim 8, further comprising
   a second reflection sheet arranged in said housing to face said second side surface.

10. The planar light source apparatus according to claim 1, wherein
    said point light source is a light emitting diode configured to output any of a red color light, a green color light, a blue color light, and a white color light.

11. The planar light source apparatus according to claim 1, wherein
    said first angle decreases with increase of a distance from said first side surface closer to said point light source to said valley of said sawtooth shape.

12. The planar light source apparatus according to claim 4, wherein
    when a refractive index of said light guide plate is defined as n and an angle formed from said point light source to one of said concavity and convexity of said second side surface is defined as an angle $\theta$,
    a relationship of said first angle+said angle $\theta$>arcsin $(1/n)$ is satisfied in said one of concavity and convexity.

13. A display apparatus comprising the planar light source apparatus according to claim 1, and a display panel arranged on said opening portion of said planar light source apparatus.

14. The planar light source apparatus according to claim 5, wherein said first angle is 50° or less.

* * * * *